(12) United States Patent
Luttrell et al.

(10) Patent No.: US 7,006,631 B1
(45) Date of Patent: Feb. 28, 2006

(54) METHOD AND SYSTEM FOR EMBEDDING BINARY DATA SEQUENCES INTO VIDEO BITSTREAMS

(75) Inventors: Maximilian Luttrell, Los Angeles, CA (US); Jiangtao Wen, La Jolla, CA (US)

(73) Assignee: Packet Video Corporation, San Diego, CA (US)

( * ) Notice: Subject to any disclaimer, the term of this patent is extended or adjusted under 35 U.S.C. 154(b) by 1084 days.

(21) Appl. No.: 09/614,371

(22) Filed: Jul. 12, 2000

(51) Int. Cl.
*H04N 7/16* (2006.01)

(52) U.S. Cl. .................... 380/217; 380/269; 382/236; 348/420

(58) Field of Classification Search ............... 380/217, 380/269; 382/100, 236; 718/20; 704/50; 348/384–440; 708/20
See application file for complete search history.

(56) References Cited

U.S. PATENT DOCUMENTS

| | | | | |
|---|---|---|---|---|
| 5,682,204 A | * | 10/1997 | Uz et al. ............... | 375/240.15 |
| 5,821,887 A | * | 10/1998 | Zhu ............... | 341/67 |
| 6,141,448 A | * | 10/2000 | Khansari et al. ............ | 382/236 |
| 6,226,387 B1 | * | 5/2001 | Tewfik et al. ............... | 382/100 |
| 6,330,672 B1 | * | 12/2001 | Shur ............... | 713/176 |
| 6,373,960 B1 | * | 4/2002 | Conover et al. ............ | 382/100 |
| 6,493,457 B1 | * | 12/2002 | Quackenbush et al. ..... | 382/100 |
| 6,687,384 B1 | * | 2/2004 | Isnardi ............... | 382/100 |
| 6,754,277 B1 | * | 6/2004 | Heinzelman et al. .. | 375/240.27 |

OTHER PUBLICATIONS

Kiya et al., A method of inserting binary data into MPEG bitstreams for video index labeling, IEEE, US, vol. 4 of 4, Oct. 24, 1999, pp. 285-289.*

* cited by examiner

*Primary Examiner*—Emmanuel L. Moise
*Assistant Examiner*—Minh Dieu Nguyen
(74) *Attorney, Agent, or Firm*—Patents&TMS, P.C.

(57) ABSTRACT

The present invention is a method and system which extracts, manipulates and embeds data from a compressed and standard compliant video bitstream which may be used for digital rights management, e.g. controlling access to a bitstream or for authenticating a video bitstream.

The method embeds binary data bits into compressed and standard compliant video bitstream with minimal visual artifacts. The method first parses the compressed video bitstream and locates coded blocks. The codeword C for the last triplet in the original block($RUN_c$, $LEVEL_c$, $LAST_c=1$) is replaced by the VLC code word C' for the last triplet ($RUN_{C'}$, $LEVEL_{C'}$, $LAST_{C'}=0$). A codeword corresponding to a triplet with LAST=1 is placed after C' whose sign bit "s" can be either 0 or 1 and is an embedded data bit, and can be used for authentication.

26 Claims, 1 Drawing Sheet

Method of Embedding Data for Authentication Purposes

Method of Embedding Data for Authentication Purposes

METHOD AND SYSTEM FOR EMBEDDING BINARY DATA SEQUENCES INTO VIDEO BITSTREAMS

BACKGROUND OF THE INVENTION

The present invention generally relates to a method and a system for embedding binary data sequences into video bitstreams which may be utilized in a Digital Rights Management (DRM) system. Further, the present invention relates to a method and a system for embedding binary data into compressed standard compliant video bitstreams without having to first decompress the video bitstream and then re-compress the manipulated video sequence with data embedded. The present invention is especially suitable for bitstreaming to set-top boxes, wireless telephones, handheld devices, multimedia servers or gateways, where the computational and memory requirements for real-time compression of video materials is prohibitively expensive. In accordance with the present invention, the embedded data can be any binary data sequence. In particular, it may be utilized in a Digital Rights Management system for authentication and access control purposes, such as, for example, access control, creating signatures, watermarking, and/or in-band signaling.

Demands for full motion video in such applications as video telephony, video conferencing, and/or multimedia applications have required the introduction of standards for motion video on computers and related systems. Such applications have further required development of compression techniques that can reduce the amount of data required to represent a moving image and corresponding sound to manageable lengths to, for example, facilitate data transmission using conventional communications equipment with limited transmission capabilities.

One set of standards for compression of motion picture video images for transmission or storage is known as the Motion Picture Experts Group ("MPEG") family of standards. Each MPEG standard is an international standard for the compression of motion video pictures and audio. The MPEG standards allow motion picture video to be compressed along with corresponding high quality sound and to provide other features such as single frame advance, reverse motion, and still-frame video.

Two versions of the MPEG video standard which have received widespread adoption are commonly known as the MPEG-1 and MPEG-2 standards. In general, the MPEG-2 standard has higher resolution and quality than the MPEG-1 standard and enables broadcast transmission at a rate of 4–6 Mbps. In addition to the MPEG-1 and MPEG-2 standards, the MPEG-4 standard is now standardized by the International Organization of Standardization ("ISO") and the International Electrotechnical Commission ("IEC"). The MPEG-4 standard is intended to facilitate, for example, content-based interactivity and certain wireless applications.

Another family of video compression standards is standardized by the International Telecommunications Union-Telecommunications Section ("ITU"). The ITU family of video coding standards has evolved from the original H.261 for video conferencing applications over ISDN to H.262 (same as MPEG-2) and now the latest H.263 version 3, which supports many advanced optional operation modes.

The video codes specified by the MPEG and ITU standards are very similar and provide compression of a digital video sequence by utilizing a block motion-compensated Discrete Cosine Transform ("DCT"). In a first block matching step of the DCT process, an algorithm estimates and compensates for the motion that occurs between two temporally adjacent frames. The frames are then compensated for the estimated motion and compared to form a difference image. By taking the difference between the two temporally adjacent frames, all existing temporal redundancy is removed. The only information that remains is new information that may not be compensated for in the motion estimation and compensation algorithm.

In a second step, this new information is transformed into the frequency domain using the DCT. The DCT has the property of compacting the energy of this new information into a few low frequency components. Further compression of the video sequence is obtained by limiting the amount of high frequency information encoded through quantization and entropy coding of information after quantization.

In the MPEG and H.263 motion-compensated transform coding based standards, the basic unit for motion compensation and transform are "blocks" which are non-overlapping 8 pixels×8 pixels. Four spatially adjacent blocks form a macroblock ("MB") which has a size of 16×16 pixels. All pixels contained in an MB are usually assumed to have the same motion. The DCT transform is performed independently on each 8×8 block in the MB. A motion vector is associated with a particular MB, and the present frame of a video sequence may be found by searching over a predetermined search area in the previous temporally adjacent frame for a best match to the MB.

Utilizing the estimated motion vectors, a copy of the previous frame may be altered by each vector to produce a prediction of the current frame. This operation is referred to as motion compensation. As described above, each predicted MB may be subtracted from the current MB to produce a differential MB whose four blocks are transformed independently into the frequency domain by the DCT. These coefficients are quantized and entropy encoded using variable length codes ("VLCs") to provide further compression of the original video sequence. Both the motion vectors and the DCT coefficients are transmitted to the decoder wherein an inverse operation is performed to produce the decoded video sequence.

MBs coded with the above described process are called "INTER" MBs since inter-frame correlation was utilized in the compression of these MBs. All parts of the INTER coding process are lossless except for the quantization which introduces unrecoverable distortion to the reconstructed video. Because of the predictive coding process of INTER MBs in MPEG and H.263, quantization distortion accumulates from frame-to-frame and eventually makes prediction inefficient. In addition, scenarios, such as scene changes or large motion video, may also make prediction unsatisfactory for some MBs in a video frame. For these MBs, MPEG and H.263 offer an option of coding image data independently that is similar to block-based still image compression with 8×8 block based DCT and entropy coding of quantized DCT coefficients. MBs coded in this manner are termed "INTRA" MBs. The information on whether an MB is coded as "INTER" or "INTRA" may be transmitted as part of the MB "header information."

For both INTER and INTRA MBs, many of the DCT coefficients are zero after quantization. Therefore, to achieve better entropy coding efficiency, the VLC codes are not coded with quantized coefficients themselves, but are coded with the non-zero coefficients and the number of consecutive zero coefficients between them. More specifically, before entropy compression coding of run-length coded quantized DCT coefficients, the DCT coefficients in an 8×8 block are mapped to EVENTs which are triplets of the form EVENT=

(RUN, LEVEL, LAST), where RUN designates the number of consecutive DCT coefficients that are quantized to zero since the last non-zero DCT coefficient; LEVEL designates the amplitude and the sign of the current non-zero coefficient; and LAST designates whether the current non-zero coefficient is the last non-zero coefficient in the block. All EVENTs generated by non-zero coefficients in an 8×8 block have LAST=0 except for the last EVENT in a block for which LAST=1.

As computers and computer networks become faster and more ubiquitous and publication and distribution of digital content via the internet become more widespread, the ability to manage the usage rights to this content more securely is increasingly significant. Such management of usage rights is commonly referred to as Digital Rights Management (DRM). The use of DRM techniques in video or multimedia delivery networks may involve embedding data into video bitstreams for providing access control and authentication, watermarking or other in-band signaling features. Although the issue of access control and authentication in image and video communications has been considered by some algorithms, many of these algorithms operate on uncompressed image or video intensity field data. For pre-encoded or legacy bitstreams, this requires decoding or pre-encoded data, data embedding, and then re-encoding. Because real-time video encoding is extremely memory and computation intensive, this type of approach is not suitable for large scale video servers and/or gateways that connect to a large number of clients and serve a large set of different compressed video materials at different sizes and rates under a usually tight delay-time budget. Such decoding and re-encoding is also not suitable for applications such as hand-held devices where memory and computation power resources are very limited.

An additional concern of DRM techniques or systems is the issue of error resiliency when DRM systems are deployed in wireless networks. Wireless networks often suffer from packet loss and/or biterrors to data during data transmission. As a result, to deliver content over wireless channels, in a manner that preserves the utility of the DRM system, it is necessary for the DRM system to be error resilient. Unfortunately, security and error resiliency have contradictory requirements. A good encryption scheme has to be a good randomizer, while redundancy is needed to achieve resiliency. One existing error resilient DRM scheme involves channel coding. Channel coding consists of adding redundancy to the data in order to protect it from the effects of errors. However, channel coding is in general not very effective in dealing with bursty errors and often involves significant overhead and/or delay.

A need, therefore, exists for an improved error resilient DRM method and system for providing authentication and access control in video delivery over wireless networks.

SUMMARY OF THE INVENTION

The present invention provides a method and a system for embedding binary bits into a standard compliant compressed video bitstream for use in DRM systems and other systems. Further, the present invention provides a method and a system for embedding binary bits without having to decode and subsequently re-encode the original video bitstream.

To this end, in an embodiment of the present invention, a method for embedding information into a digitally compressed bitstream is provided. The method comprises the steps of: starting with a compressed bitstream; identifying locations in the bitstream for embedding data into the bitstream; and replacing original codewords in the bitstream with alternate codewords having embedded data bits.

In an embodiment, the bitstream is scanned to find spatial locations for embedding data bits.

In an embodiment, the bitstream is scanned to find temporal locations for embedding data bits.

In an embodiment, a system is provided for embedding information into a digitally compressed bitstream. The system has a compressed bitstream, a means for identifying locations in the compressed bitstream, and a means for replacing original codewords in the bitstream with alternate codewords.

In an embodiment, a means is provided for scanning the bitstream to locate INTER or INTRA blocks (hereinafter, the "blocks") wherein the blocks contain the original codewords.

In an embodiment, the bitstream has final codewords and further wherein the locations in the bitstream for embedding data into the bitstream correspond to the final codewords in the bitstream.

In an embodiment, the blocks have a last non-zero coefficient having an index number of less than 63.

In an embodiment, the codewords have a triplet form of EVENT=(RUN, LEVEL, LAST) and further wherein the final codewords in the bitstream have "LAST" coefficients=1.

In an embodiment, a means is provided for replacing final codewords in the bitstream with replaced codewords wherein the replaced codewords have LAST coefficients=0.

In an embodiment, a means is provided for appending alternate codewords to the replaced codewords wherein the alternate codewords="0111s" wherein the "s" represents the embedded data bit.

In an embodiment, the compressed bitstream corresponds to a compressed video bitstream.

It is, therefore, an advantage of the present invention to provide a method and a system that embeds binary bits into a compressed video bitstream.

A further advantage of the present invention is to provide a method and a system for embedding binary bits into a compressed video bitstream without decoding and subsequently re-encoding the bitstream.

Moreover, an advantage of the present invention is to provide a method and a system for embedding binary bits into a compressed video bitstream that parses the compressed video bitstream and searches for the blocks.

A still further advantage of the present invention is to provide a method and a system for embedding binary bits into a compressed video bitstream that replaces the last triplet in the blocks with an embedded data bit.

In addition, an advantage of the present invention is to provide a method and a system for embedding binary bits into a compressed video bitstream where a code word in the video bitstream is replaced with an alternate code word having the embedded data bit.

A still further advantage of the present invention is to provide a method and a system for embedding binary bits into a compressed video bitstream that is suitable for devices where memory and/or computational power resources are limited.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
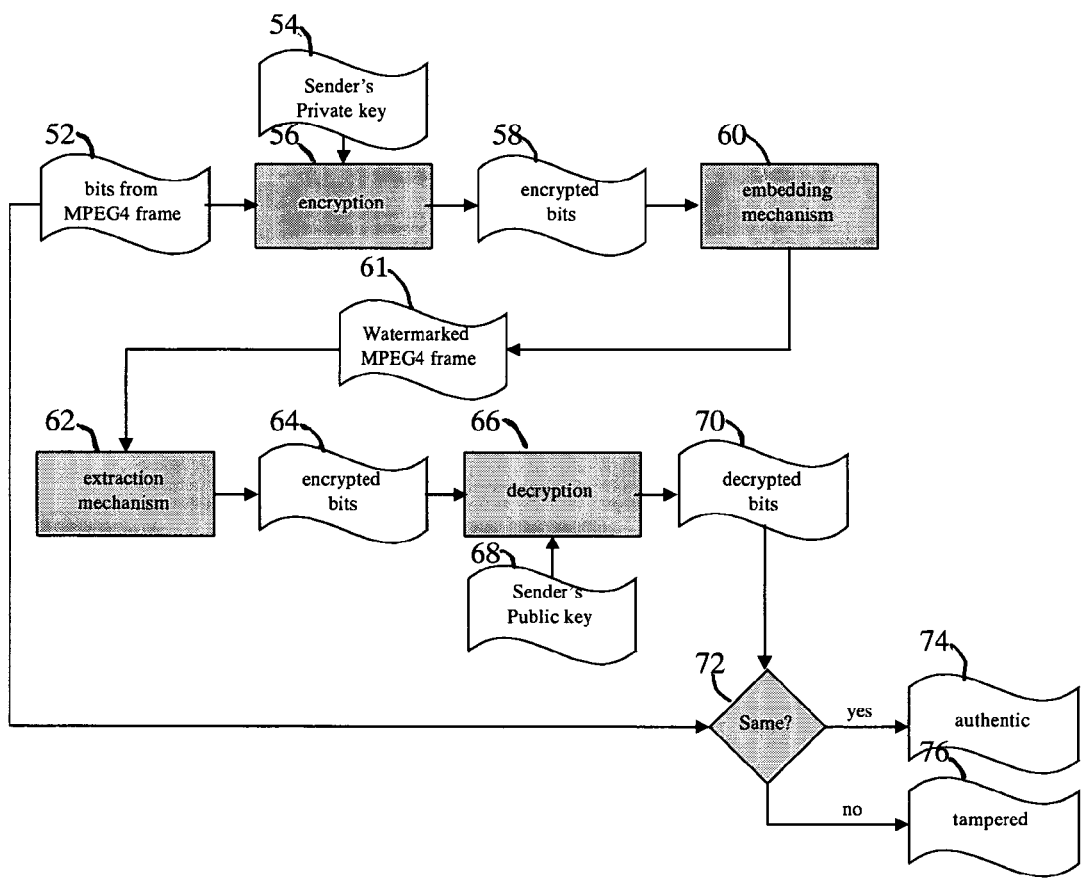
FIG. 1 illustrates a black box diagram of a system in an embodiment of the present invention.

The present invention provides a method and a system for embedding binary bits into a compressed video bitstream. Further, the present invention relates to a digital rights management method and system for embedding binary bits into a standard video bitstream without having to decode and/or subsequently re-encode the original video bitstream.

Referring to FIG. 1, a flowchart presents a method of embedding data into a compressed bitstream for authentication purposes. According to the method, blocks are located in the original pre-compressed bitstream. For each block which is located, the codeword C=(RUN$_C$, LEVEL$_C$, LAST$_C$=1) for the last triplet in the original bitstream may be replaced with a VLC codeword C'=(RUN$_C$, LEVEL$_C$, LAST$_{C'}$=0), and a codeword corresponding to a triplet with LEVEL=1 and LAST=1 is placed after C', whose sign bit "s" is either 0 or 1 and is an embedded data bit. With reference to Tables 1 and 2, the codewords in the tables issued for the most commonly occurring EVENTs for the luminance and chrominance components of INTRA and INTER blocks wherein EVENT=(RUN, LEVEL, LAST). The last bit "s" of each VLC code denotes the sign of the LEVEL: "0" for positive and "1" for negative. The remaining combinations of EVENT=(RUN, LEVEL, LAST) are coded with the escape code in the tables, followed by a 23-bit fixed length code ("FLC") for a total of 30 bits. The FLC starts with the 2-bit pattern "11" which is followed by a 1-bit LAST flag, a 6-bit RUN, and a 12-bit LEVEL with a marker bit before and after the LEVEL bits.

TABLE 1

VLC Table for Intra Luminance and Chrominance TCOEF

| VLC Code | LAST | RUN | LEVEL |
|---|---|---|---|
| 10s | 0 | 0 | 1 |
| 1111 s | 0 | 0 | 3 |
| 0101 01s | 0 | 0 | 6 |
| 0010 111s | 0 | 0 | 9 |
| 0001 1111 s | 0 | 0 | 10 |
| 0001 0010 1s | 0 | 0 | 13 |
| 0001 0010 0s | 0 | 0 | 14 |
| 0000 1000 01s | 0 | 0 | 17 |
| 0000 1000 00s | 0 | 0 | 18 |
| 0000 0000 111s | 0 | 0 | 21 |
| 0000 0000 110s | 0 | 0 | 22 |
| 0000 0100 000s | 0 | 0 | 23 |
| 110s | 0 | 0 | 2 |
| 0101 00s | 0 | 1 | 2 |
| 0001 1110 s | 0 | 0 | 11 |
| 0000 0011 11s | 0 | 0 | 19 |
| 0000 0100 001s | 0 | 0 | 24 |
| 0000 0101 0000s | 0 | 0 | 25 |
| 1110 s | 0 | 1 | 1 |
| 0001 1101 s | 0 | 0 | 12 |
| 0000 0011 10s | 0 | 0 | 20 |
| 0000 0101 0001s | 0 | 0 | 26 |
| 0110 1s | 0 | 0 | 4 |
| 0001 0001 1s | 0 | 0 | 15 |
| 0000 0011 01s | 0 | 1 | 7 |
| 0110 0s | 0 | 0 | 5 |
| 0001 0001 0s | 0 | 4 | 2 |
| 0000 0101 0010s | 0 | 0 | 27 |
| 0101 1s | 0 | 2 | 1 |
| 0000 0011 00s | 0 | 2 | 4 |

TABLE 1-continued

VLC Table for Intra Luminance and Chrominance TCOEF

| VLC Code | LAST | RUN | LEVEL |
|---|---|---|---|
| 0000 0101 0011s | 0 | 1 | 9 |
| 0100 11s | 0 | 0 | 7 |
| 0000 0010 11s | 0 | 3 | 4 |
| 0000 0101 0100s | 0 | 6 | 3 |
| 0100 10s | 0 | 0 | 8 |
| 0000 0010 10s | 0 | 4 | 3 |
| 0100 01s | 0 | 3 | 1 |
| 0000 0010 01s | 0 | 8 | 2 |
| 0100 00s | 0 | 4 | 1 |
| 0000 0010 00s | 0 | 5 | 3 |
| 0010 110s | 0 | 1 | 3 |
| 0000 0101 0101s | 0 | 1 | 10 |
| 0010 101s | 0 | 2 | 2 |
| 0010 100s | 0 | 7 | 1 |
| 0001 1100 s | 0 | 1 | 4 |
| 0001 1011 s | 0 | 3 | 2 |
| 0001 0000 1s | 0 | 0 | 16 |
| 0001 0000 0s | 0 | 1 | 5 |
| 0000 1111 1s | 0 | 1 | 6 |
| 0000 1111 0s | 0 | 2 | 3 |
| 0000 1110 1s | 0 | 3 | 3 |
| 0000 1110 0s | 0 | 5 | 2 |
| 0000 1101 1s | 0 | 6 | 2 |
| 0000 1101 0s | 0 | 7 | 2 |
| 0000 0100 010s | 0 | 1 | 8 |
| 0000 0100 011s | 0 | 9 | 2 |
| 0000 0101 0110s | 0 | 2 | 5 |
| 0000 0101 0111s | 0 | 7 | 3 |
| 0111s | 1 | 0 | 1 |
| 0000 1100 1s | 0 | 11 | 1 |
| 0000 0000 101s | 1 | 0 | 6 |
| 0011 11s | 1 | 1 | 1 |
| 0000 0000 100s | 1 | 0 | 7 |
| 0011 10s | 1 | 2 | 1 |
| 0011 01s | 0 | 5 | 1 |
| 0011 00s | 1 | 0 | 2 |
| 0010 011s | 1 | 5 | 1 |
| 0010 010s | 0 | 6 | 1 |
| 0010 001s | 1 | 3 | 1 |
| 0010 000s | 1 | 4 | 1 |
| 0001 1010 s | 1 | 9 | 1 |
| 0001 1001 s | 0 | 8 | 1 |
| 0001 1000 s | 0 | 9 | 1 |
| 0001 0111 s | 0 | 10 | 1 |
| 0001 0110 s | 1 | 0 | 3 |
| 0001 0101 s | 1 | 6 | 1 |
| 0001 0100 s | 1 | 7 | 1 |
| 0001 0011 s | 1 | 8 | 1 |
| 0000 1100 0s | 0 | 12 | 1 |
| 0000 1011 1s | 1 | 0 | 4 |
| 0000 1011 0s | 1 | 1 | 2 |
| 0000 1010 1s | 1 | 10 | 1 |
| 0000 1010 0s | 1 | 11 | 1 |
| 0000 1001 1s | 1 | 12 | 1 |
| 0000 1001 0s | 1 | 13 | 1 |
| 0000 1000 1s | 1 | 14 | 1 |
| 0000 0001 11s | 0 | 13 | 1 |
| 0000 0001 10s | 1 | 0 | 5 |
| 0000 0001 01s | 1 | 1 | 3 |
| 0000 0001 00s | 1 | 2 | 2 |
| 0000 0100 100s | 1 | 3 | 2 |
| 0000 0100 101s | 1 | 4 | 2 |
| 0000 0100 10s | 1 | 15 | 1 |
| 0000 0100 111s | 1 | 16 | 1 |
| 0000 0101 000s | 0 | 14 | 1 |
| 0000 0101 1001s | 1 | 0 | 8 |
| 0000 0101 100s | 1 | 5 | 2 |
| 0000 0101 1011s | 1 | 6 | 2 |
| 0000 0101 1100s | 1 | 17 | 1 |
| 0000 0101 101s | 1 | 18 | 1 |
| 0000 0101 1110s | 1 | 19 | 1 |
| 0000 0101 1111s | 1 | 20 | 1 |
| 0000 011 | escape | | |

TABLE 2

VLC table for Inter Lumimance and Chrominance TCOEF

| VLC Code | LAST | RUN | LEVEL |
|---|---|---|---|
| 10s | 0 | 0 | 1 |
| 1111 s | 0 | 0 | 2 |
| 0101 01s | 0 | 0 | 3 |
| 0010 111s | 0 | 0 | 4 |
| 0001 1111 s | 0 | 0 | 5 |
| 0001 0010 1s | 0 | 0 | 6 |
| 0001 0010 0s | 0 | 0 | 7 |
| 0000 1000 01s | 0 | 0 | 8 |
| 0000 1000 00s | 0 | 0 | 9 |
| 0000 0000 111s | 0 | 0 | 10 |
| 0000 0000 110s | 0 | 0 | 11 |
| 0000 0100 000s | 0 | 0 | 12 |
| 110s | 0 | 1 | 1 |
| 0101 00s | 0 | 1 | 2 |
| 0001 1110 s | 0 | 1 | 3 |
| 0000 0011 11s | 0 | 1 | 4 |
| 0000 0100 001s | 0 | 1 | 5 |
| 0000 0101 0000s | 0 | 1 | 6 |
| 1110 s | 0 | 2 | 1 |
| 0001 1101 s | 0 | 2 | 2 |
| 0000 0011 10s | 0 | 2 | 3 |
| 0000 0101 0001s | 0 | 2 | 4 |
| 0110 1s | 0 | 3 | 1 |
| 0001 0001 1s | 0 | 3 | 2 |
| 0000 0011 01s | 0 | 3 | 3 |
| 0110 0s | 0 | 4 | 1 |
| 0001 0001 0s | 0 | 4 | 2 |
| 0000 0101 0010s | 0 | 4 | 3 |
| 0101 1s | 0 | 5 | 1 |
| 0000 0011 00s | 0 | 5 | 2 |
| 0000 0101 0011s | 0 | 5 | 3 |
| 0100 11s | 0 | 6 | 1 |
| 0000 0010 11s | 0 | 6 | 2 |
| 0000 0101 0100s | 0 | 6 | 3 |
| 0100 10s | 0 | 7 | 1 |
| 0000 0010 10s | 0 | 7 | 2 |
| 0100 01s | 0 | 8 | 1 |
| 0000 0010 01s | 0 | 8 | 2 |
| 0100 00s | 0 | 9 | 1 |
| 0000 0010 00s | 0 | 9 | 2 |
| 0010 110s | 0 | 10 | 1 |
| 0000 0101 0101s | 0 | 10 | 2 |
| 0010 101s | 0 | 11 | 1 |
| 0010 100s | 0 | 12 | 1 |
| 0001 1100 s | 0 | 13 | 1 |
| 0001 1011 s | 0 | 14 | 1 |
| 0001 0000 1s | 0 | 15 | 1 |
| 0001 0000 0s | 0 | 16 | 1 |
| 0000 1111 1s | 0 | 17 | 1 |
| 0000 1111 0s | 0 | 18 | 1 |
| 0000 1110 1s | 0 | 19 | 1 |
| 0000 1110 0s | 0 | 20 | 1 |
| 0000 1101 1s | 0 | 21 | 1 |
| 0000 1101 0s | 0 | 22 | 1 |
| 0000 0100 010s | 0 | 23 | 1 |
| 0000 0100 011s | 0 | 24 | 1 |
| 0000 0101 0110s | 0 | 25 | 1 |
| 0000 0101 0111s | 0 | 26 | 1 |
| 0111 s | 1 | 0 | 1 |
| 0000 1100 1s | 1 | 0 | 2 |
| 0000 0000 101s | 1 | 0 | 3 |
| 0011 11s | 1 | 1 | 1 |
| 0000 0000 100s | 1 | 1 | 2 |
| 0011 10s | 1 | 2 | 1 |
| 0011 01s | 1 | 3 | 1 |
| 0011 00s | 1 | 4 | 1 |
| 0010 011s | 1 | 5 | 1 |
| 0010 010s | 1 | 6 | 1 |
| 0010 001s | 1 | 7 | 1 |
| 0010 000s | 1 | 8 | 1 |
| 0001 1010 s | 1 | 9 | 1 |
| 0001 1001 s | 1 | 10 | 1 |
| 0001 1000 s | 1 | 11 | 1 |
| 0001 0111 s | 1 | 12 | 1 |
| 0001 0110 s | 1 | 13 | 1 |
| 0001 0101 s | 1 | 14 | 1 |
| 0001 0100 s | 1 | 15 | 1 |
| 0001 0011 s | 1 | 16 | 1 |
| 0000 1100 0s | 1 | 17 | 1 |
| 0000 1011 1s | 1 | 18 | 1 |
| 0000 1011 0s | 1 | 19 | 1 |
| 0000 1010 1s | 1 | 20 | 1 |
| 0000 1010 0s | 1 | 21 | 1 |
| 0000 1001 1s | 1 | 22 | 1 |
| 0000 1001 0s | 1 | 23 | 1 |
| 0000 1000 1s | 1 | 24 | 1 |
| 0000 0001 11s | 1 | 25 | 1 |
| 0000 0001 10s | 1 | 26 | 1 |
| 0000 0001 01s | 1 | 27 | 1 |
| 0000 0001 00s | 1 | 28 | 1 |
| 0000 0100 100s | 1 | 29 | 1 |
| 0000 0100 101s | 1 | 30 | 1 |
| 0000 0100 110s | 1 | 31 | 1 |
| 0000 0100 111s | 1 | 32 | 1 |
| 0000 0101 1000s | 1 | 33 | 1 |
| 0000 0101 1001s | 1 | 34 | 1 |
| 0000 0101 1010s | 1 | 35 | 1 |
| 0000 0101 1011s | 1 | 36 | 1 |
| 0000 0101 1100s | 1 | 37 | 1 |
| 0000 0101 1101s | 1 | 38 | 1 |
| 0000 0101 1110s | 1 | 39 | 1 |
| 0000 0101 1111s | 1 | 40 | 1 |
| 0000 011 | | escape | |

In Table 3, all VLC codewords for EVENTs with LAST=1 from Table 1 are listed, and, in each row, the codeword for the EVENT with the same RUN and LEVEL, but with LAST=0, is also given. The EVENTs with LAST=1 that need to be coded with the FLC are not listed because the same code length is used for the EVENTs with LAST=0. According to Table 3, the codeword for the EVENT with LAST=1 is generally longer than for the corresponding EVENT in the same row with LAST=0.

TABLE 3

Difference between LAST = 0 and LAST = 1 VLCs for INTRA macroblock DCT TCOEF

| | | VLC Code | | Len |
|---|---|---|---|---|
| RUN | LEVEL | LAST = 1 | LAST = 0 | Diff. |
| 0 | 1 | 0111 s | 10s | 2 |
| 1 | 1 | 0011 11s | 1110 s | 2 |
| 2 | 1 | 0011 10s | 0101 1s | 1 |
| 0 | 2 | 0011 00s | 110s | 3 |
| 5 | 1 | 0010 011s | 0011 01s | 1 |
| 3 | 1 | 0010 001s | 0100 01s | 1 |
| 4 | 1 | 0010 000s | 0100 00s | 1 |
| 9 | 1 | 0001 1010 s | 0001 1000 s | 0 |
| 0 | 3 | 0001 0110 s | 1111 s | 4 |
| 6 | 1 | 0001 0101 s | 0010 010s | 1 |
| 7 | 1 | 0001 0100 s | 0010 100s | 1 |
| 8 | 1 | 0001 0011 s | 0001 1001 s | 0 |
| 0 | 4 | 0000 1011 1s | 0110 1s | 4 |
| 1 | 2 | 0000 1011 0s | 0101 00s | 3 |
| 10 | 1 | 0000 1010 1s | 0001 0111 s | 1 |
| 11 | 1 | 0000 1010 0s | 0000 1100 1s | 0 |
| 12 | 1 | 0000 1001 1s | 0000 1100 0s | 0 |
| 13 | 1 | 0000 1001 0s | 0000 0001 11s | −1 |
| 14 | 1 | 0000 1000 1s | 0000 0101 1000 s | −3 |
| 0 | 5 | 0000 0001 10s | 0110 0s | 5 |
| 1 | 3 | 0000 0001 10s | 0010 110s | 3 |
| 2 | 2 | 0000 0001 00s | 0010 101s | 3 |
| 0 | 6 | 0000 0000 101s | 0101 01s | 5 |

TABLE 3-continued

Difference between LAST = 0 and LAST = 1 VLCs for INTRA macroblock DCT TCOEF

| RUN | LEVEL | VLC Code LAST = 1 | LAST = 0 | Len Diff. |
|---|---|---|---|---|
| 3 | 2 | 0000 0100 100s | 0001 1011 s | 3 |
| 0 | 7 | 0000 0000 100s | 0100 11s | 5 |
| 4 | 2 | 0000 0100 101s | 0001 0001 0s | 2 |
| 15 | 1 | 0000 0100 110s | FLC (30 bits) | −18 |
| 16 | 1 | 0000 0100 111s | FLC (30 bits) | −18 |
| 0 | 8 | 0000 0101 1001 s | 0100 10s | 6 |
| 5 | 2 | 0000 0101 1010 s | 0000 1110 0s | 3 |
| 6 | 2 | 0000 0101 1011 s | 0000 1101 1s | 3 |
| 17 | 1 | 0000 0101 1100 s | FLC (30 bits) | −17 |
| 18 | 1 | 0000 0101 1101 s | FLC (30 bits) | −17 |
| 19 | 1 | 0000 0101 1110 s | FLC (30 bits) | −17 |
| 20 | 1 | 0000 0101 1111 s | FLC (30 bits) | −17 |

Therefore, the video bitstream may be parsed to get the MB type (INTER or INTRA) information to embed data into compressed video bitstreams. For each block, the last codeword for DCT information may be found. By definition of LAST, this codeword C corresponds to an EVENT=(RUN$_C$, LEVEL$_C$, LAST$_C$) with LAST$_C$=1. In other words, the codeword C is removed from the bitstream and replaced with the codeword for the EVENT=(RUN$_C$, LEVEL$_C$, LAST$_C$=0). The codeword "0111S" is then be used to terminated the block.

Although the present method embeds five bits to the end of each block for every one data bit embedded, the overhead introduced by the above-described method is relatively small. As shown in Table 3, most EVENTs with LAST=1 have a longer code length than the EVENT with the same RUN and LEVEL but with LAST=0. Most times, after appending the amended codeword, a total extra overhead of less than five bits is produced. Accordingly, Table 4 shows the length overhead in bits after the proposed manipulation of the bitstream for a plurality of various EVENTS at various RUN and LEVEL values.

TABLE 4

Length Overhead After Proposed Embedding Operation

| RUN | LEVEL | Length Overhead after Proposed Operation |
|---|---|---|
| 0 | 1 | 3 |
| 1 | 1 | 3 |
| 2 | 1 | 4 |
| 0 | 2 | 2 |
| 5 | 1 | 4 |
| 3 | 1 | 4 |
| 4 | 1 | 4 |
| 9 | 1 | 5 |
| 0 | 3 | 1 |
| 6 | 1 | 4 |
| 7 | 1 | 4 |
| 8 | 1 | 5 |
| 0 | 4 | 1 |
| 1 | 2 | 2 |
| 10 | 1 | 4 |
| 11 | 1 | 5 |
| 12 | 1 | 5 |
| 13 | 1 | 6 |
| 14 | 1 | 8 |
| 0 | 5 | 0 |
| 1 | 3 | 2 |
| 2 | 2 | 2 |
| 0 | 6 | 0 |
| 3 | 2 | 2 |
| 0 | 7 | 0 |
| 4 | 2 | 3 |
| 15 | 1 | 23 |
| 16 | 1 | 23 |
| 0 | 8 | −1 |
| 5 | 2 | 2 |
| 6 | 2 | 2 |
| 17 | 1 | 22 |
| 18 | 1 | 22 |
| 19 | 1 | 22 |
| 20 | 1 | 22 |

The additional codeword appended to the end of an block corresponds to inserting a frequency that was not actually present in the sequence, and, therefore, introduces some noise. However, because the appended codeword may be inserted after the non-zero DCT coefficient of the highest spatial frequency present in the block, the introduced noise may likely be of a high spatial frequency. Further, because the codeword for embedding corresponds to an EVENT of LEVEL=1, the introduced noise may likely be small. Overall, the visual effect of this data-embedding method may be designed to be based on image content analysis, scene change detection, characteristics of the human visual systems and/or other like systems that may be apparent to those skilled in the art to pick appropriate blocks to apply this data-embedding method.

It should be noted that, because there can be at most 64 non-zero coefficients in a block, for blocks whose original last non-zero DCT coefficient is the 64$^{th}$ coefficient, the above described manipulation is impossible. In addition, if the original last non-zero DCT coefficient is the 64$^{th}$ coefficient, and the above-described method is performed, it will become ambiguous to the decoder if the last codeword "0111s" is added to the amended codeword. Therefore, in an embodiment it is useful to circumvent these problems, and the codeword replacement and the adding of the appended codeword may therefore be done only when the last non-zero coefficient has an index number smaller than 63. Then, if the decoder that attempts to extract data from a data-embedded bitstream finds the LAST=1 for the 64$^{th}$ coefficient, that LEVEL must be a "true" DCT coefficient.

Using the above, the flowchart, as shown in FIG. 1, shows the method of embedding data into bitstreams for authentication purposes. According to FIG. 1, certain bits from the original bitstream (shown as bits from an MPEG 4 frame 52, however, other types of bitstreams may be used) are extracted from the bitstream. The bits 52 are then passed through a public key encryption device via an encryption step 56 via a sender's private key 54 thereby producing encrypted bits 58. An embedding mechanism 60 then embeds the encrypted bits 58 into the bitstream thereby producing a watermarked MPEG 4 frame 61.

A receiver, after receiving the bitstream may extract the encrypted bits 64 using an extraction mechanism 62. The encrypted bits 64 may then be decrypted via the decryption step 66. The encrypted bits 64 may be decrypted using a public key 68 which may be published. The decrypted bits 70 may then be checked against the original frame data via step 72. If the original bits from the MPEG 4 frame 52 and the decrypted bits 70 are the same, then the bitstream may be authentic as shown in step 74. Alternatively, if the original bits from the MPEG 4 frame 52 are not the same as the decrypted bits 70 via step 76, then the bitstream may have been tampered with.

Using the above-identified method via the flowchart 50, the method and the sender's public key may be published. The private key 54 remains secure.

Although the above application has been described primarily in the context of adding a specific codeword (i.e. "0111s") to the DCT information of blocks in an MPEG or H.263 compliant compressed video bitstreams, one skilled in the art can readily appreciate that the teachings of the present invention may be modified to append other codewords to possibly other types of MBs or to selectively choose locations for data embedding based on an algorithm that the embedded data extracting decoder can easily access.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A method for embedding information into a digitally compressed bitstream, the method comprising the steps of:
   providing a compressed bitstream;
   determining a type of coding of the compressed bitstream wherein the type of coding is inter coding or intra coding;
   identifying locations in the bitstream for embedding data bits into the bitstream;
   extracting a plurality of data bits from the locations of the bitstream;
   producing embedded data bits based on the plurality of data bits from the bitstream wherein the embedded data bits are based on the coding of the compressed bitstream; and
   replacing original codewords in the bitstream with alternate codewords having the embedded data bits.

2. The method of claim 1 further comprising the step of:
   scanning the bitstream to find spatial locations for embedding data bits.

3. The method of claim 1 further comprising the step of:
   scanning the bitstream to find temporal locations for embedding data bits.

4. The method of claim 1 further comprising the step of:
   scanning the bitstream to find spatial or temporal locations for embedding data bits that can be reliably recovered by an error resilience decoder if the bitstream is subject to errors during transmission.

5. The method of claim 1 further comprising the step of:
   finding blocks wherein the blocks have a last non-zero coefficient having an index number of less than 63.

6. The method of claim 1 wherein the original codewords have a triplet form of EVENT=(RUN, LEVEL, LAST) and further wherein final codewords in the bitstream have a "LAST" coefficient=1.

7. The method of claim 6 further comprising the step of:
   replacing the final codewords so that the final codewords have a "LAST" coefficient=0.

8. The method of claim 6 further comprising the step of:
   appending alternate codewords to the final codewords in the bitstream.

9. The method of claim 8 wherein the alternate codewords "0111s" wherein the "s" corresponds to the embedded data bit.

10. The method of claim 1 wherein the bitstream is compliant with international standards.

11. The method of claim 1 wherein the bitstream is a video bitstream.

12. A system for embedding information into a digitally compressed bitstream, the system comprising:
    a compressed bitstream;
    means for determining a type of coding of the compressed bitstream wherein the type of coding is inter coding or intra coding;
    means for identifying locations in the compressed bitstream wherein the locations are based on the type of coding of the compressed bitstream;
    embedded data bits produced by encrypting a plurality of data bits at the locations in the compressed bitstream; and
    means for replacing original codewords in the bitstream with alternate codewords having the embedded data bits.

13. The system of claim 12 further comprising:
    means for scanning the bitstream to locate blocks wherein the blocks contain the original codewords.

14. The system of claim 13 wherein the blocks have a last non-zero coefficient having an index number of less than 63.

15. The system of claim 13 wherein the compressed bitstream corresponds to a compressed video bitstream.

16. The system of claim 12 wherein the bitstream has final codewords and further wherein the locations in the bitstream for embedding data into the bitstream correspond to the final codewords in the bitstream.

17. The system of claim 12 wherein the codewords have a triplet form of EVENT=(RUN, LEVEL, LAST) and further wherein final codewords in the bitstream have a "LAST" coefficient=1.

18. The system of claim 12 further comprising:
    means for replacing final codewords in the bitstream with replaced codewords wherein the replaced codewords have a LAST coefficient=0.

19. The system of claim 18 further comprising:
    means for appending alternate codewords to the replaced codewords wherein the appended codewords="0111s" wherein the "5" represents the embedded data bit.

20. A method for embedding information into a digitally compressed bitstream, the method comprising the steps of:
    providing a compressed bitstream;
    identifying locations in the bitstream for embedding data into the bitstream;
    replacing original codewords in the bitstream with alternate codewords having embedded data bits; and
    finding blocks wherein the blocks have a last non-zero coefficient having an index number of less than 63.

21. A method for embedding information into a digitally compressed bitstream, the method comprising the steps of:
    providing a compressed bitstream;
    identifying locations in the bitstream for embedding data into the bitstream;
    replacing original codewords in the bitstream with alternate codewords having embedded data bits wherein the original codewords have a triplet form of EVENT=(RUN, LEVEL, LAST) and further wherein final codewords in the bitstream have a "LAST" coefficient=1; and
    replacing the final codewords so that the final codewords have a "LAST" coefficient=0.

22. A method for embedding information into a digitally compressed bitstream, the method comprising the steps of:
provide a compressed bitstream;
identifying locations in the bitstream for embedding data into the bitstream;
replacing original codewords in the bitstream with alternate codewords having embedded data bits wherein the original codewords have a triplet form of EVENT=(RUN, LEVEL, LAST) and further wherein final codewords in the bitstream have a "LAST" coefficient=1; and
appending alternate codewords to the final codewords in the bitstream.

23. The method of claim 22 wherein the alternate codewords="0111s" wherein the "s" corresponds to the embedded data bit.

24. A system for embedding information into a digitally compressed bitstream, the system comprising:
a compressed bitstream;
means for identifying locations in the compressed bitstream;
means for replacing original codewords in the bitstream with alternate codewords having embedded data bits;
means for scanning the bitstream to locate blocks wherein the blocks contain the original codewords wherein the blocks have a last non-zero coefficient having an index number of less than 63.

25. A system for embedding information into a digitally compressed bitstream, the system comprising:
a compressed bitstream;
means for identifying locations in the compressed bitstream;
means for replacing original codewords in the bitstream with alternate codewords having embedded data bits; and
means for replacing final codewords in the bitstream with replaced codewords wherein the replaced codewords have a LAST coefficient=0.

26. A system for embedding information into a digitally compressed bitstream, the system comprising:
a compressed bitstream;
means for identifying locations in the compressed bitstream;
means for replacing original codewords in the bitstream with alternate codewords having embedded data bits;
means for replacing final codewords in the bitstream with replaced codewords wherein the replaced codewords have a LAST coefficient=0; and
means for appending alternate codewords to the replaced codewords wherein the appended codewords="0111s" wherein the "s" represents the embedded data bit.

* * * * *